May 19, 1942.  E. A. MEANS  2,283,564
DRILLING MUD
Filed June 21, 1939
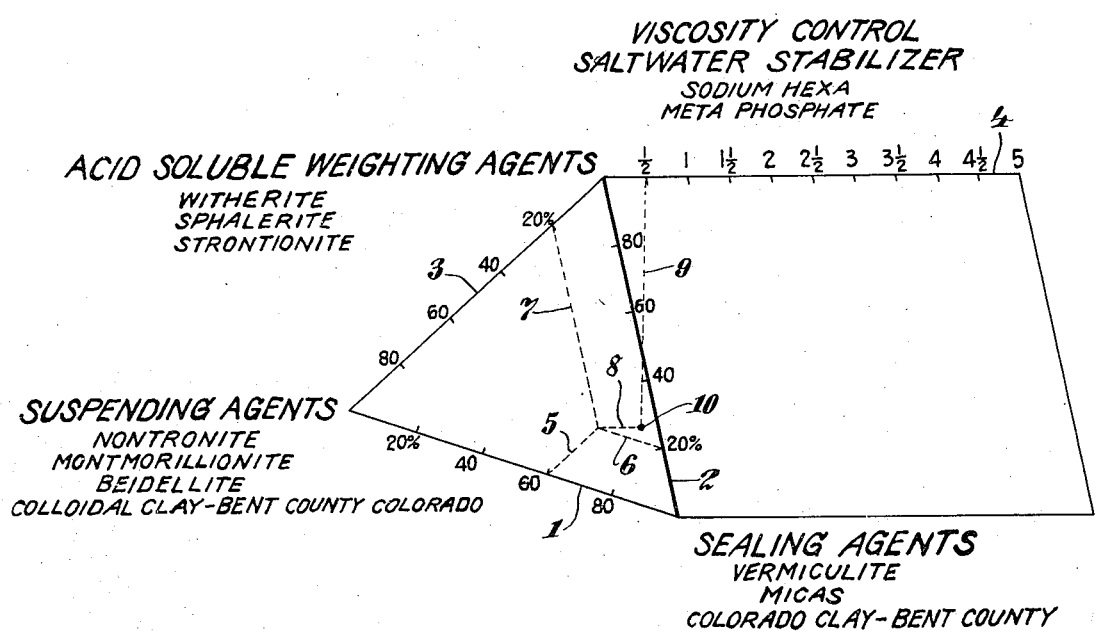
INVENTOR.
Eldon A. Means,
BY
ATTORNEY.

Patented May 19, 1942

2,283,564

UNITED STATES PATENT OFFICE 2,283,564

DRILLING MUD

Eldon A. Means, Wichita, Kans., assignor, by direct and mesne assignments, of forty-two and one-half per cent to William Carpenter, Scott City, forty-two and one-half per cent to L. R. Kestor, Garden City, Kans., and fifteen per cent to Carl Bingesser Application June 21, 1939, Serial No. 280,231

3 Claims. (Cl. 252—8.5)

The present invention relates to muds used in the drilling of oil and or gas wells.

For a long time, muds have been chosen from natural clays. Various materials have been added to make such clays better suited to particular needs encountered. Thus weighting agents have been added to increase specific gravity. Lime has been used to induce flocculation. Calcite has been added to make the muds acid removable.

The use of such additions introduces certain difficulties or disadvantages. Thus for example, to make an acid removable weighting material with barytes and calcite, it is difficult or almost impossible to combine all the properties desirable for drilling purposes. Usually such a mud, if it is acid removable, will not be heavy enough, or if it is heavy enough, it will not be acid removable. On the other hand, if it combines both these qualities, it may not be sufficiently suspendable, that is, remain in suspension.

Particular objects of the present invention are to effect a practical control of these several properties and so to produce a drilling mud having the qualities necessary to meet different conditions encountered.

Other objects and the novel features of the invention by which all objects are attained, are set forth or will appear in the course of the following specification.

The single figure in the drawing accompanying and forming part of the specification is a diagrammatic representation of the various features which make up the invention.

One of the important features of the invention is the combining of the two properties of weighting and acid removability in one special weighting material. As examples, barium carbonate and zinc sulphide are both satisfactory weighting materials and these are acid removable as well.

This is of special importance in enabling prospecting with a rotary drill. In the past, when weighted muds have been used in rotary drilling and the drill has passed through an unexpected oil or gas showing, the sand was mudded off, making it then very difficult and many times impossible to recover from such a discovery. With the special acid removable weighting agent of the present invention, when the drill passes through an oil or gas showing which is mudded off, the formation can be easily uncovered by removal of the weighting material through ordinary acid treating methods.

Drilling methods now in use require that muds be thickened or gelled when drilling through sand or gravel, to prevent loss of circulation and caving of the hole. The development of the art therefore has been toward the creation of a greater gel strength.

The present invention involves discovery of the fact that when clays are purified so that they are almost 100% suspending agents, they lose their sealing qualities. Thus for example, pure montmorillionite has practically no sealing qualities and will run through a filter like milk or any other pure colloid. This is true even when it is caused to gel.

Under this invention, a small percentage of what is here termed a sealing agent is added to decrease the permeability of the filter cake so that practically no leakage or loss of circulation can occur. Thus instead of endeavoring to increase sealing quality by additions of lime and flocculating material as heretofore, which impair the suspendability of the mud, under the present invention, small quantities of special sealing agents are added, for example, such minerals as vermiculite, micas, fuller's earth and preflocculite clays, such as those found in Bent County, Colorado.

The invention involves further the discovery that the suspendability of clays and the protection of same from salt water is greatly aided by the use of small quantities of phosphates, such for example as sodium hexa meta phosphate.

In drilling operations, the encounter of salt water will cause gelling of ordinary drilling muds sometimes to the extent of making it practically impossible to pump the mud. Sodium hexa meta phosphate will deflocculate the gel and restore the mud to an operable viscosity. Such material therefore serves as a useful viscosity control.

The accompanying diagram illustrates the possibilities of compounding a drilling mud to meet different requirements.

The figure is an illustration of a three-sided solid prism, with the end laid off in scales 1, 2, 3, representing percentages of the three major components, suspending agents, sealing agents and acid removable weighting agents and with longitudinal extent laid off in a scale 4 representing viscosity control and salt water stabilizing. Varying percentages of suspending agents, sealing agents, weighting agents and viscosity control medium will find a point in the body of such a prism. The percentages shown on the equilateral triangle are read in the usual manner for triangular diagrams. The sum of the normals to the sides will always equal 1 and hence any point within the triangle will represent 100% of the three components shown at the corners. The percentage of viscosity control and salt water stabilizer appears on the length of the prism. The three components making up the base or end are considered as equalling 100% of the mud, minus the percentage on the longitudinal scale so that the final total will equal 100%.

In the particular example illustrated, the mud is made up of a combination of 60% suspending agents, such as nontronite, montmorillionite, beidellite or colloidal clay, 20% sealing agents, such as vermiculite, micas or Colorado clay of the type in Bent County and 20% acid soluble weighting agents, such as witherite, sphalerite, strontionite, with a viscosity control and salt water stabilizer such as sodium hexa meta phosphate of ½%. Lines 5, 6, 7, drawn normal from the three base scales and extended at 8, to meet the line 9, from the longitudinal scale 4, meet at the point 10, within the outlines of such prism.

Obviously many combinations are possible. For drilling under conditions that do not require a high specific gravity, the percentage of mud soluble weight agent may be kept at approximately zero and various combinations of suspending the sealing agents be used, as conditions require.

Under what may be considered usual drilling conditions, a mixture of approximately 50% suspending agent and 50% sealing agent, with from zero to ½% of viscosity control and salt water stabilizer, when made up to from 4 to 8% in water, will form a mud having good suspending properties, a viscosity of 15 centipoises, which is more or less the standard for good drilling practice, and a sealing action better than the A. P. I. rating of "Excellent" Drilling and Production Practice, 1937, A. P. I. page 27. As pressure conditions in drilling may require, this mud can be weighted to produce densities up to about 13 lbs. per gallon.

For purposes such as sealing off dry holes and abandoned wells, the weighting material may be reduced to zero and the sealing agent raised to above 80% This mixture when made up in water to 12 to 15% will provide a very viscous mud, which will permanently stay in place in an abandoned or dry hole, thus to prevent migration of ground water from one level to another.

The suspending agent which may be a mixture of nontronite, beidellite and montmorillionite, and other clay minerals is preferably compounded with the percentage of beidellite and montmorillionite less than 75%. This is to avoid the objections and difficulties previously experienced in mixtures containing greater than 75% of beidellite and montmorillionite, which created difficulty in the wetting of the dry ground material to form a mud and caused too great a gel strength.

What is claimed is:

1. A mud for use in oil and gas wells, comprising a suspending agent of nontronite and a sealing agent of preflocculated (large particle size) Colorado clay.

2. A mud for use in oil and gas well, comprising a suspending agent of nontronite and a sealing agent of preflocculated (large particle size) Colorado clay, and an acid soluble weighting agent.

3. A mud for use in oil and gas wells, comprising a suspending agent of nontronite and a sealing agent of preflocculated (large particle size) Colorado clay, and an acid soluble weighting agent of witherite.

ELDON A. MEANS.